US006966049B2

(12) United States Patent
Lepejian et al.

(10) Patent No.: US 6,966,049 B2
(45) Date of Patent: Nov. 15, 2005

(54) SOFTWARE DEVELOPMENT TOOL EMPLOYING WORKFLOWS FOR DEVELOPING USER INTERACTIVE PROGRAMS

(75) Inventors: Yervant D. Lepejian, Palo Alto, CA (US); Gurgen Lachinian, Palo Alto, CA (US); Hovhannes Ghukasyan, Mountain View, CA (US); Arman Sagatelian, Sunnyvale, CA (US)

(73) Assignee: Heuristics Physics Laboratories, Inc., San Jose, CA (US)

( * ) Notice: Subject to any disclaimer, the term of this patent is extended or adjusted under 35 U.S.C. 154(b) by 622 days.

(21) Appl. No.: 09/841,460

(22) Filed: Apr. 24, 2001

(65) Prior Publication Data

US 2004/0015841 A1 Jan. 22, 2004

(51) Int. Cl.[7] .............................. G06F 9/44; G06F 7/00; G09G 5/00
(52) U.S. Cl. ..................... 717/102; 715/762; 707/104.1
(58) Field of Search ......................... 717/102, 100–101, 717/103–113; 705/7–9; 718/106; 707/1, 100, 102, 103 R, 103 Y, 104.1; 715/762, 763

(56) References Cited

U.S. PATENT DOCUMENTS

| 6,028,997 A | 2/2000 | Leymann et al. ........... 717/104 |
| 6,167,564 A | 12/2000 | Fontana et al. ............. 717/104 |
| 6,170,081 B1 | 1/2001 | Fontana et al. ............. 717/104 |

OTHER PUBLICATIONS

Template Software, Inc., Developing a WFT Workflow System, Template Software, Inc., Second Edition, Oct. 31, 1997.*
HPL Stastical Correlation Engine User Manual SUP00027, Version 1.0, Engine No. 10, pp. 4–8. (no year, no month).
HPL CDF Merger Engine User Manual, Engine No. 82, 4 pages (no year, no month).
HPL DB Query Engine User Manual SUP00136, Version 1.0, Engine No. 8, pp. 4–11 (no year, No month).
HPL Switch Engine User Manual SUP00040, Version 1.0, Engine No. 20, pp. 4–7 (no year, no month).
HPL Conditional Execution Engine Use Manual SUP00096, Version 2.1, Engine No. 23, pp. 4–8 (no year, no month).
HPL Chart Axis Selection Engine SUP00135, Version 1.0, Engine No. 104, pp. 4–10 (no year, no month).
HPL Drill Down Engine User Manual SUP00139, Version 1.0, Engine No. 105, pp. 4–8 (no year, no month).
HPL WorkflowView Users Guide SUP00052, Version 2.2, HPL Inc., pp. 1–66, 2000.
HPL YIELDXplorer Users Guide SUP00017, Version 1.01, HPL Inc. pp. 1–83, 2000.

* cited by examiner

*Primary Examiner*—Antony Nguyen-Ba
(74) *Attorney, Agent, or Firm*—Sierra Patent Group, Ltd.

(57) ABSTRACT

A software development tool employing workflows for developing user interactive programs is described. The tool includes means for displaying a workspace on a computer screen, and means for displaying objects on the computer screen that are individually selectable to be placed and coupled together in the workspace to define a workflow for a user interactive program. Several objects have interactively alterable operation parameters. One object performs an interactively alterable switch function for directing data flow within the workflow. Another object facilitates branch processing according to a user indicated selection from displayed information generated by the user interactive program. Another object facilitates assigning a name to an input port of another object so that data may be directly provided to that input port. Another object prompts a user for input when a condition is met while executing the user interactive program. Also described is a method performing these functions of the software development tool.

73 Claims, 10 Drawing Sheets

SOFTWARE DEVELOPMENT TOOL EMPLOYING WORKFLOWS FOR DEVELOPING USER INTERACTIVE PROGRAMS

FIELD OF THE INVENTION

The present invention generally relates to software development tools and in particular, to a software development tool employing workflows for developing user interactive programs.

BACKGROUND OF THE INVENTION

User interactive programs are particularly useful for data analysis applications such as the analysis of semiconductor manufacturing yields. In such applications, a user (i.e., the individual running the program) may desire to conduct additional data processing activity based upon results to that point. Ideally, the program would be interactive so that the user could specify such additional data processing activity at various preselected points during execution of the program.

A graphical user interface (GUI) employing workflow methodology whereby objects are placed and coupled together in a workspace on the computer display screen to develop application programs is a useful type of software development tool. One advantage of such a GUI is that the developer (i.e., the individual developing the program) does not need to have any particular programming language expertise. Another advantage is that the objects made available to the developer are all fully tested, including the interfaces that allow them to couple to other objects.

Conventional GUIs employing workflow methodology, however, are not generally configured to develop user interactive programs. The programs generated by these software development tools process data in a fixed manner that cannot be easily altered by the user. In order to change the processing or presentation of data in these programs, the program itself must be rewritten or modified. Thus, the analysis of data using such programs tends to be slower and results of such analysis inferior than if the programs were user interactive.

OBJECTS AND SUMMARY OF THE INVENTION

Accordingly, it is an object of the present invention to provide a software development tool employing workflows for developing user interactive programs.

Another object is to provide such a software development tool so as to include means for users to modify the processing of data at various pre-selected points while running the programs.

Another object is to provide such a software development tool so as to include flexible means for users to modify the presentation or reporting of data at various pre-selected points while running the programs.

These and additional objects are accomplished by the various aspects of the present invention, wherein briefly stated, one aspect is a software development tool employing workflows for developing user interactive programs, comprising: means for displaying a workspace on a computer screen; and means for displaying objects on the computer screen that are individually selectable to be placed and coupled together in the workspace to define a workflow for a user interactive program, wherein at least one of the objects has at least one interactively alterable operation parameter during the execution of the user interactive program.

Another aspect is a method employing workflows for developing user interactive programs, comprising: displaying a workspace on a computer screen; and displaying objects on the computer screen that are individually selectable by a program developer to be placed and coupled together in the workspace to define a workflow for a user interactive program, wherein at least one of the objects has at least one interactively alterable operation parameter during the execution of the user interactive program.

Another aspect is a software development tool employing workflows for developing user interactive programs, comprising: means for displaying a workspace on a computer screen; and means for displaying objects on the computer screen that are individually selectable to be placed and coupled together in the workspace to define a workflow for a user interactive program, wherein at least one of the objects performs an interactively alterable switch function for directing data flow within the workflow.

Another aspect is a method employing workflows for developing user interactive programs, comprising: displaying a workspace on a computer screen; and displaying objects on the computer screen that are individually selectable by a developer to be placed and coupled together in the workspace to define a workflow for a user interactive program, wherein at least one of the objects performs an interactively alterable switch function for directing data flow within the user interactive program.

Another aspect is a software development tool employing workflows for developing user interactive programs, comprising: means for displaying a workspace on a computer screen; and means for displaying objects on the computer screen that are individually selectable to be placed and coupled together in the workspace to define a workflow for a user interactive program, wherein at least one of the objects facilitates branch processing according to a user indicated selection from displayed information generated by the user interactive program.

Another aspect is a method employing workflows for developing user interactive programs, comprising: displaying a workspace on a computer screen; and displaying objects on the computer screen that are individually selectable by a developer to be placed and coupled together in the workspace to define a workflow for a user interactive program, wherein at least one of the objects facilitates branch processing according to a user indicated selection from displayed information generated by the user interactive program.

Another aspect is a software development tool employing workflows for developing user interactive programs, comprising: means for displaying a workspace on a computer screen; and means for displaying objects on the computer screen that are individually selectable to be placed and coupled together in the workspace to define a workflow for a user interactive program, wherein at least one of the objects facilitates assigning a name to a selected input port of another one of said objects so that data may be directly provided to the input port.

Still another aspect is a method employing workflows for developing user interactive programs, comprising: displaying a workspace on a computer screen; and displaying objects on the computer screen that are individually selectable to be placed and coupled together in the workspace to define a workflow for a user interactive program, wherein at least one objects facilitates assigning a name to a selected input port of another one of said objects so that data may be directly provided to the input port.

Another aspect is a software development tool employing workflows for developing user interactive programs, comprising: means for displaying a workspace on a computer screen; and means for displaying objects on the computer screen that are individually selectable to be placed and coupled together in the workspace to define a workflow for a user interactive program, wherein at least one of the objects prompts a user for input when a condition is met while executing the user interactive program.

Yet another aspect is a method employing workflows for developing user interactive programs, comprising: displaying a workspace on a computer screen; and displaying objects on the computer screen that are individually selectable by a program developer to be placed and coupled together in the workspace to define a workflow for a user interactive program, wherein at least one of the objects prompts a user for input when a condition is met while executing the user interactive program.

Additional objects, features and advantages of the various aspects of the invention will become apparent from the following description of its preferred embodiments, which description should be taken in conjunction with the accompanying drawings.

DETAILED DESCRIPTION OF THE PREFERRED EMBODIMENT

Figure 1:
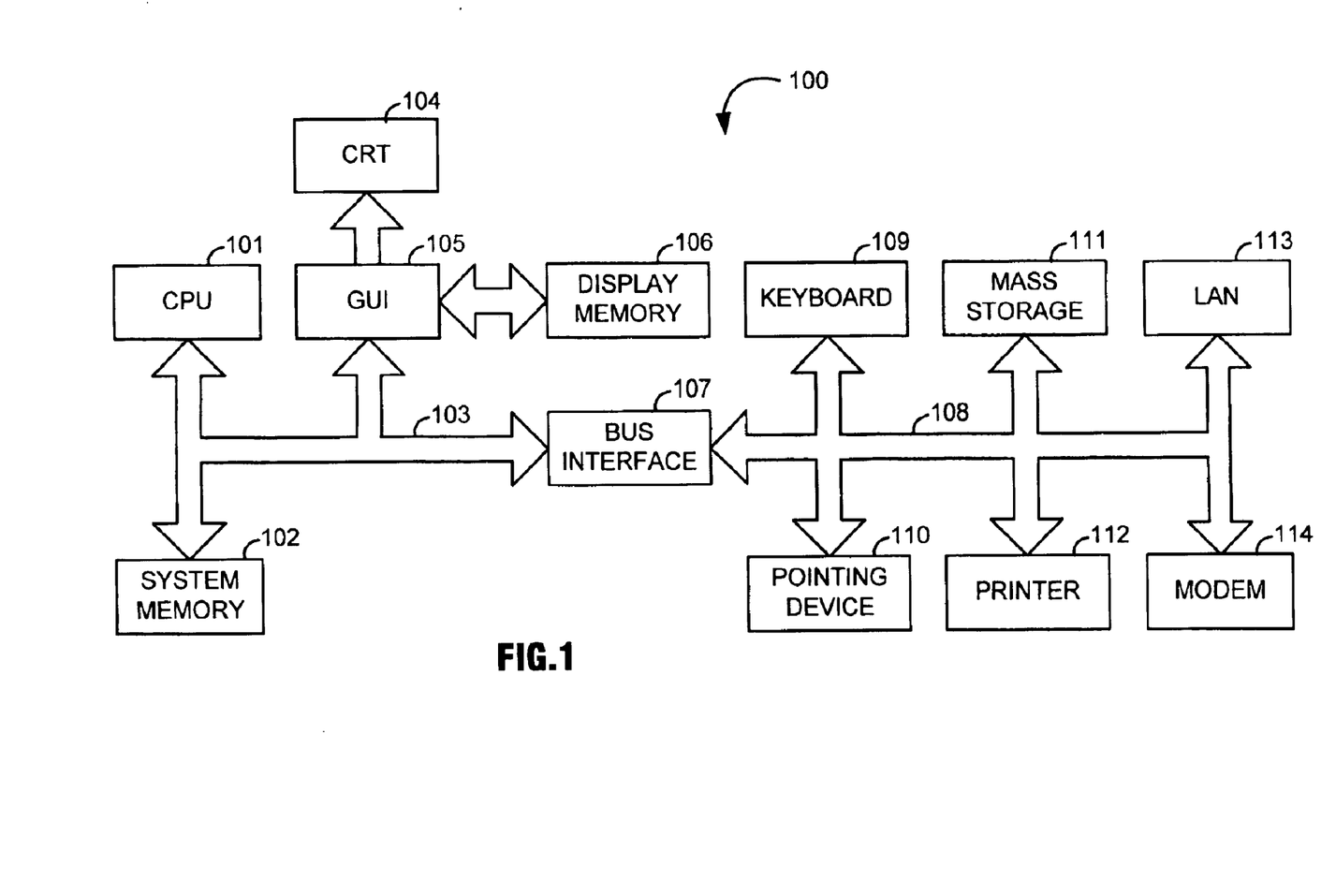
FIG. 1 illustrates, as an example, a block diagram of a computer system, utilizing aspects of the present invention.

FIG. 1 illustrates a block diagram of a computer system 100. A software development tool for developing user interactive programs runs on the computer system 100. The developed user interactive programs may run on the computer system 100 or another computer system. The developer using the software development tool may also be the user of the user interactive programs, or the user may be another individual.

Included in the computer system 100 are a central processing unit (CPU) 101 such as those typically employed in engineering work stations, system memory 102 such as dynamic random-access memory (DRAM) or other random-access solid-state memory, mass storage 111 such as one or more hard disk drive units, and a number of input and output devices for user interaction with the computer system. The input devices include a keyboard 109 and a user manipulated pointing device 110 such as a mouse, touch pad, digital tablet, trackball or joystick. The output devices include a cathode-ray-tube (CRT) monitor 104 or other computer display such as an active matrix liquid crystal display, and a printer 112 or other output device such as a plotter.

The CPU 101 is coupled to the system memory 102, a bus interface 107, and the CRT 104 through system bus 103. A GUI 105 is employed in conjunction with display memory 106 for a user to interact with the computer system 100 through the CRT 104, keyboard 109 and pointing device 110. The bus interface 107 couples the keyboard 109, the pointing device 110, the mass storage 111, and the printer 112 to the CPU 101 through a peripheral bus 108 and the system bus 103. A local area network (LAN) 113 and a modem 114 are also included. Both the LAN 113 and modem 114 are useful for communication purposes with other computer systems and their databases, as well as for other conventional purposes such as downloading programs and data from such other computer systems into the mass storage unit 111.

Figure 2:
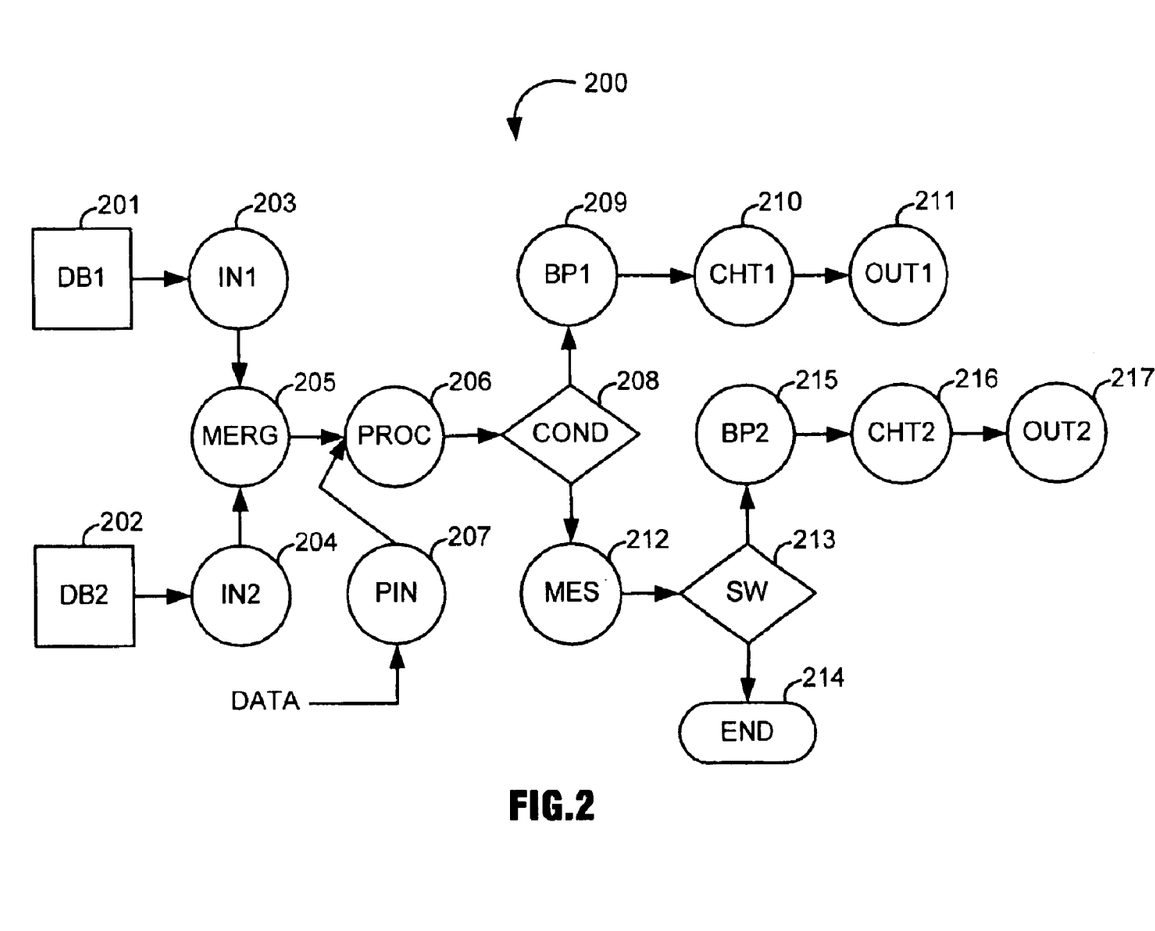
FIG. 2 illustrates, as an example, a workflow for a user interactive program, utilizing aspects of the present invention.

FIG. 2 illustrates an example of a workflow 200 for a user interactive program as developed by a software development tool such as WorkflowView™, a product of HPL Inc. of San Jose, Calif. The term workflow, as used herein, means one or more objects linked together to perform a specific task or series of tasks. Workflows employ a data driven methodology based upon data flow modeling techniques from the object-oriented design world. As a declarative versus a procedural methodology, it requires very little from the developer in the way of programming knowledge, thinking or ability. The term object, as used herein, means a software module that performs a function such as data retrieval, analysis, computation, data manipulation, logic, display, data storage, or other functions. The term engine may be used interchangeably with the term object. Engines or objects have named input and/or output ports, which are the entry points for incoming or exit points for outgoing data. Each engine or object can have its own properties, which are specific for that particular workflow. Control software such as Workflow Wizard™, another product of HPL, Inc., executes the workflow. The software development tool and the control software may both reside on the computer system 100, or on different computer systems.

One particularly useful application of user interactive programs is in the area of semiconductor yield analysis. As a simple example of such an application, the workflow 200 includes a number of objects that allow user interaction during or just prior to execution of a user interactive program. Property pages for several of the objects are illustrated in FIGS. 3–8. These are simplified versions of the pages that are presented to a developer when the developer defines certain attributes for the objects during program development. On each of the illustrated property pages, a box titled "display at run time" or "allow to pick from the selection at run time" is provided. By checking this box, the developer allows a user of the user interactive program to not only see the property page (or a reduced version of it) just prior to execution of the program, but also to make changes to the developer's initial selections at that time.

In FIG. 2, a first input (IN1) object 203 extracts first specified data from a first selected database (DB1) 201, and a second input (IN2) object 204 extracts second specified data from a second selected database (DB2) 202. Although the databases 201 and 202 are not strictly part of the workflow 200, they are included in the figure for descriptive purposes. In this example, the first and second selected databases, 201 and 202, have different schemas. Therefore, the first input object 203 is configured to extract data from databases having a schema like the first selected database 201, and the second input object 204 is configured to extract data from databases having a schema like the second selected database 202. The ability to extract data from databases having different schemas is a useful feature.

Figure 3:
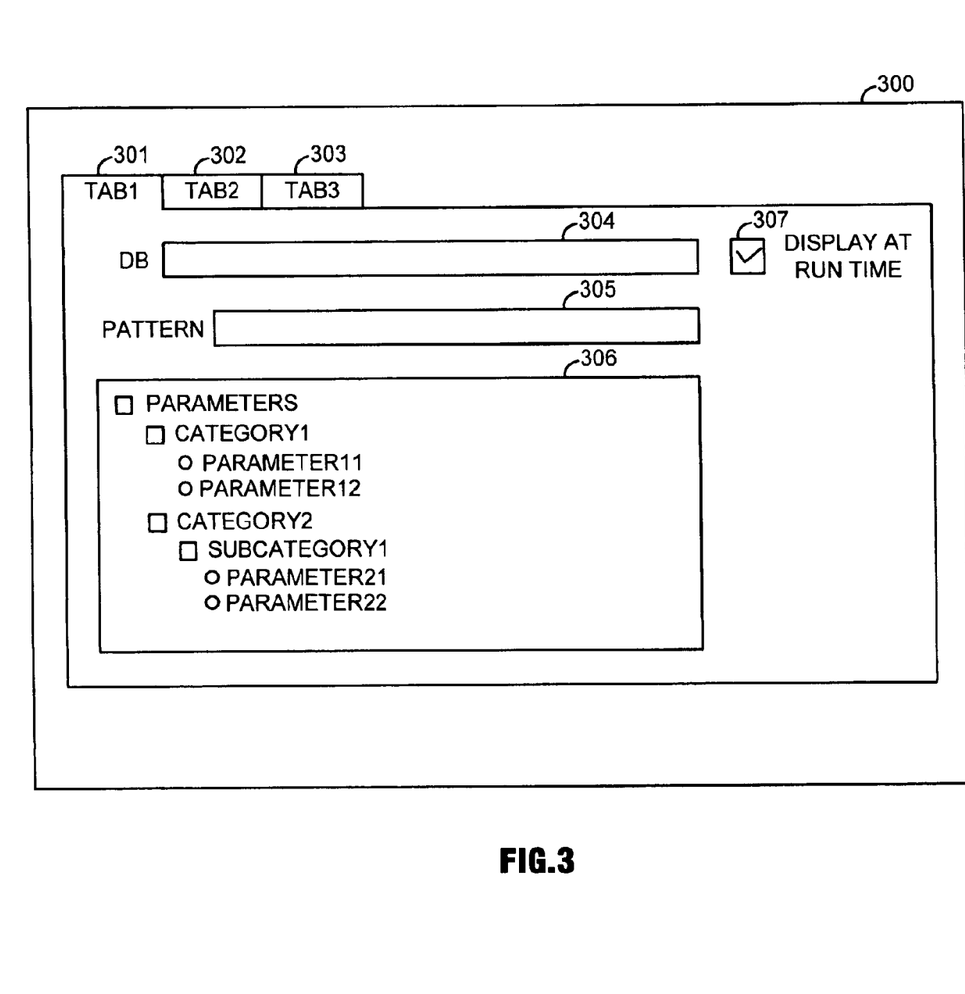
FIG. 3 illustrates, as an example, a property page for an input object, utilizing aspects of the present invention.

FIG. 3 illustrates, as a simplified example, a property page 300 for the first input object 203. In the figure, three tabs are shown. This property page 300 corresponds to TAB1 301. On this page, a program developer selects the first database 201 in the database field 304. The developer does this in a conventional manner by typing in the path to the first database 201, or selecting it from a pull-down menu, or browsing for it. In the parameters field 306, the developer selects desired operation parameters for the data extraction. For convenience, the operation parameters are divided up into categories. As an example, one category may be work-in-process (WIP) identification (ID) parameters including such parameters as technology, device, lot, and wafer. Another category may be miscellaneous operational parameters, which in turn, includes subcategories such as inspection detail including such parameters as layer or step. A box 307 is provided that when checked by the developer, causes the property page to be displayed at run time. This feature allows the user to change the developer's initial parameter selections at run time, thus providing interactively alterable operation parameters.

Figure 4:
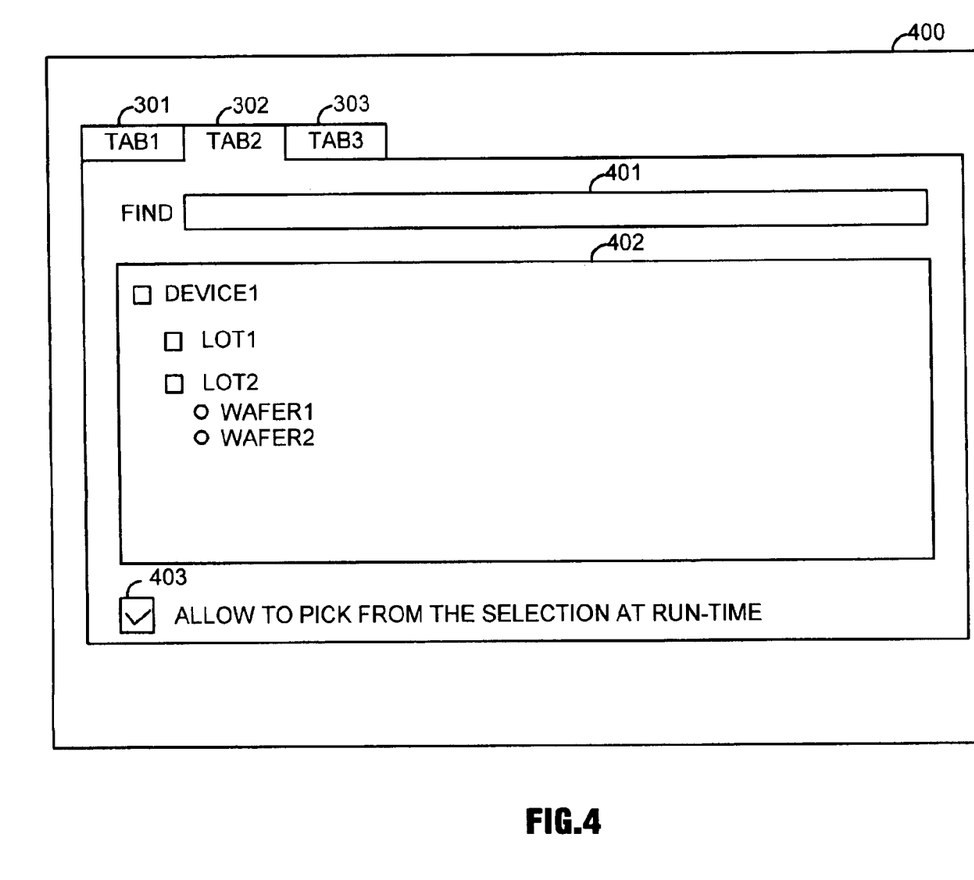
FIG. 4 illustrates, as an example, another property page for an input object, utilizing aspects of the present invention.

FIG. 4 illustrates, as an example, another property page 400 corresponding to TAB2 302 for the first input object 203. On this page, the program developer can specify additional detail on the parameters selected on the first page 300 from available items in an items field 402. As an example, where the developer has selected one or more of the parameters device, lot and wafer on the first page 300, the developer can specify additional detail on the selected parameter(s) by specifying one or more specific devices such as DEVICE1, one or more specific lots such as LOT1 and/or LOT2, and one or more specific wafers such as WAFER1 and/or WAFER2. A "display at run time" box 403 is also provided to facilitate user interactively alterable operation parameters.

TAB3 303 corresponds to another property page. Although not shown, the additional property page may provide the developer with even more options for further limiting the data to be extracted from the first selected database 201. For example, a third property page may be used for filtering or binning options based on defect types.

Figure 5:
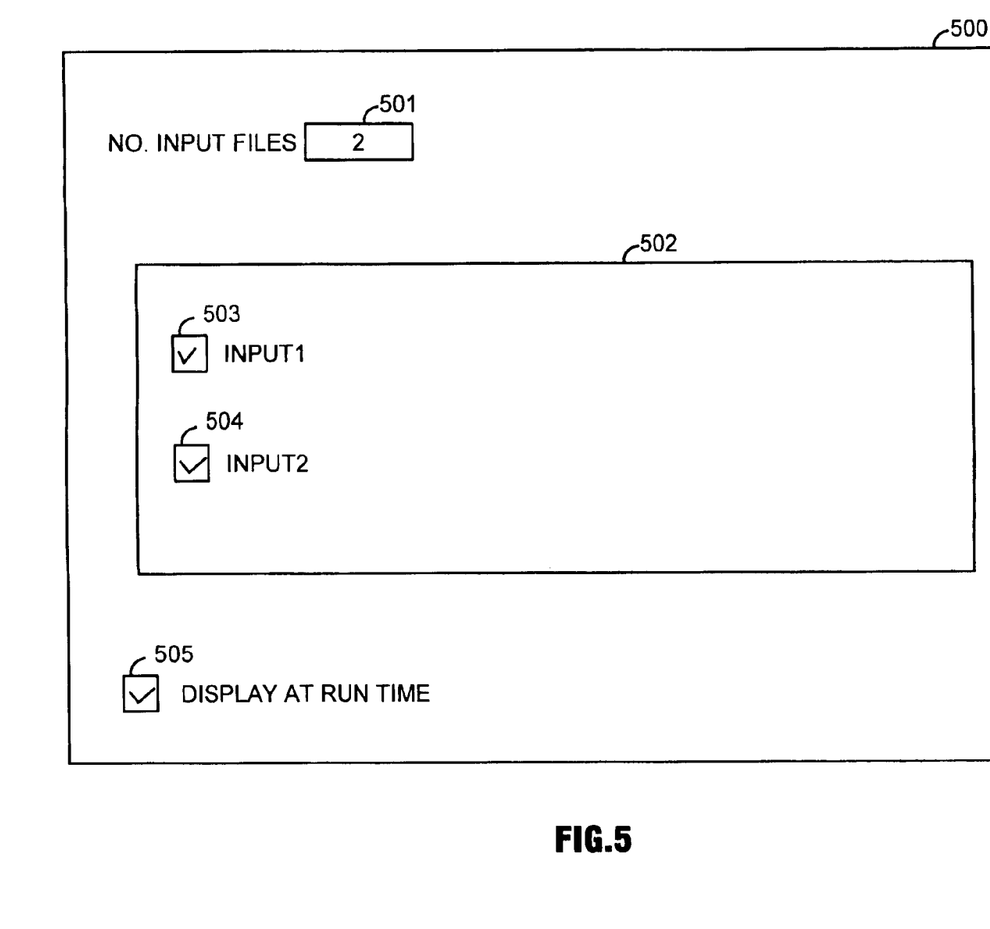
FIG. 5 illustrates, as an example, a property page for a merger object, utilizing aspects of the present invention.

Referring back to FIG. 2, the workflow 200 also includes a merger (MERG) object 205 that merges or concatenates the output files of input objects 203 and 204 into a single file that it provides to processing object 206. FIG. 5 illustrates, as an example, a property page 500 for the merger object 205. The number of input files to be merged is entered in a field 501. All input files that are available for merger are listed in pane 502. Next to each available input file is a box, and the input file is included for merger by checking the box. For example, input file INPUT1 has a box 503 that is checked, and input file INPUT2 has a box 504 that is checked. Therefore, input files INPUT1 and INPUT2 are merged in this example. A "display at run time" box 505 is also provided to facilitate user interactively alterable operation parameters.

Figure 6:
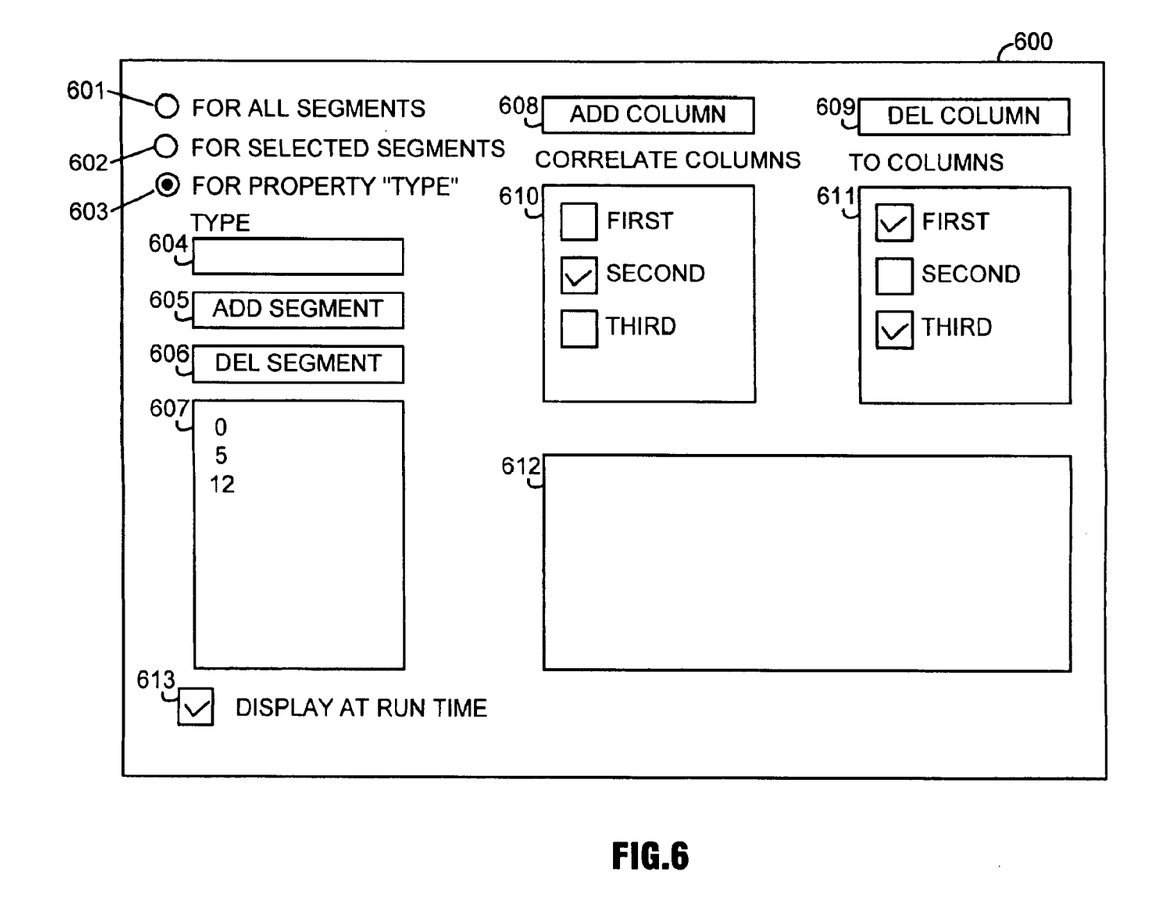
FIG. 6 illustrates, as an example, a property page for a processing object, utilizing aspects of the present invention.

The processing (PROC) object 206 may be any one of a number of statistical or other data processing objects. FIG. 6 illustrates, as an example, a property page for a statistical correlation engine. Incoming data are organized in segments. A segment represents a set of data having a particular set of attributes and parameters. Each segment has a header that stores its attributes, and columns for its parameters. For example, defect data might be a segment having attributes of device, lot and wafer, and parameters of size and location on a wafer.

Buttons 601, 602 and 603 are used to indicate which segments are to be correlated. Button 601 is clicked when all segments are to be correlated, button 602 is clicked when only selected segments are to be correlated, and button 603 is clicked (as shown in the example) when only segments of an indicated type are to be correlated. Type field 604 is used for inputting the segment type when button 603 is clicked. Buttons 605 and 606 are used to respectively add and delete segments, and segment list pane 607 lists the segments that have been added and not deleted. Buttons 608 and 609 are used to respectively add and delete columns, and column list panes 610 and 611 list the columns that have been added and not deleted. Column list panes 610 and 611 indicate which columns are to be correlated by checking appropriate boxes. For example, since the box next to SECOND is checked in column list pane 610 and the boxes next to FIRST and THIRD are checked in column list pane 611, then the second column will be correlated against the first and third columns in the specified segments. Area 612 includes additional features such as filtering of the correlation results. A "display at run time" box 613 is also provided to facilitate user interactively alterable operation parameters.

A programmable input (PIN) object 207 is inserted by the developer in the workflow 200 to allow the developer to assign an unique name to an input port of the processing object 206 so that data may be provided directly to the input port. The user of the user interactive program may then provide the data directly to the input port by adding the input port's name, the data file's name, and the data file's location in the program's execution command string. Alternatively, another program may also externally provide the data in the same manner.

A conditional execution (COND) object 208 is used to direct data flows according to conditions set by the developer or user. In this example, if the condition is not met, the data is considered normal or conforming and will be directed towards branch processing (BP) object 209. On the other hand, if the condition is met, the data is considered abnormal or nonconforming and an indication of such will be passed to messaging (MES) object 212. The conditions are set according to a property page (not shown) for the conditional execution object 208. Like other property pages, a "display at run time" button is provided to facilitate user interactively alterable operation parameters.

The branch processing (BP1) object 209 works in conjunction with chart (CHT1) object 210 and a viewer program such as YieldXplorer™, another product of HPL, Inc., to facilitate branch processing according to a user indicated selection from displayed information generated by the user interactive program. The user indicates the selection by clicking on a point or indicating an area on the display screen. In one configuration, a popup menu appears on the display screen in response to the user action, and the user selects one of a number of additional processing options in the popup menu. In another configuration, a predefined executable program is run in response to the user action.

Figure 7:
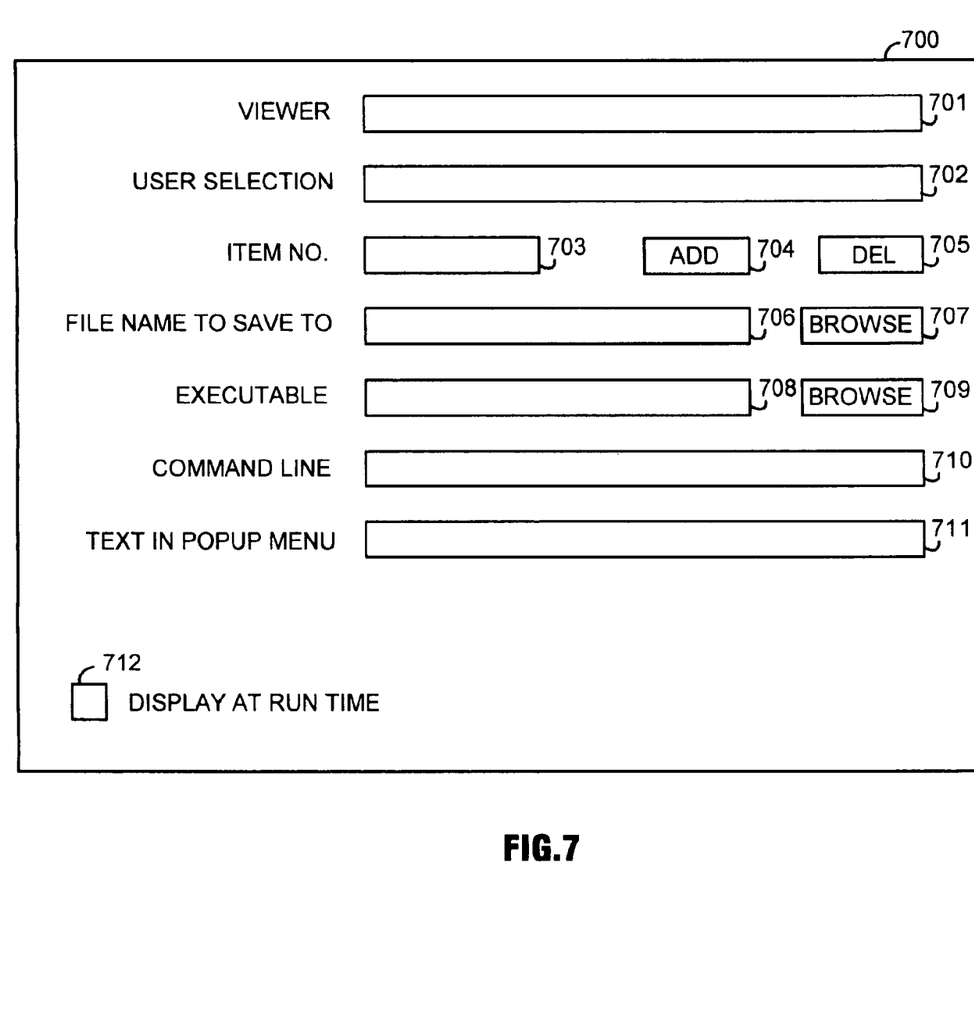
FIG. 7 illustrates, as an example, a property page for a branch processing object, utilizing aspects of the present invention.

FIG. 7 illustrates, as an example, a property page for the branch processing object 209. The viewer that the branch processing object 209 provides the following information for is identified by the developer in pulldown menu 701. Types of user indicated selections are provided in pulldown menu 702. In this example, they include OnChartAltDrawRect, OnChartPointAltClick, and OnMultiviewAreaAltClick. For each user indicated selection, fields 703 to 711 are input by the developer. OnChartAltDrawRect is a selection where the user draws a rectangle around information on a chart, then clicks a button on his or her pointing device. OnChartPointAltClick is a selection where the user points to information on a chart, then clicks a button on his or her pointing device. OnMultiviewAreaAltClick is a selection where the user points to an image being displayed on the display screen, then clicks a button on his or her pointing device.

For each user indicated selection, multiple items can be defined. Items are added by clicking the ADD button 704, and deleted by clicking the DEL button 705. Each item represents an executable option to be made available to the user in response to the user indicated selection. The executable option is input by typing it into field 708, or using the browse button 709 to find it. The command line field 710 is used to provide arguments to be used with the executable. The text in popup menu field 711 is used to provide the text that will appear in the popup menu indicating the executable as an option to the user in response to the user indicated selection. The "file name to save to" field 706 is used to specify a buffer in which branch processing data may be stored. The file name in this case may be typed into the field 706, or the browse button 707 may be used to find it. A display at run time button 712 is also provided.

Figure 8:
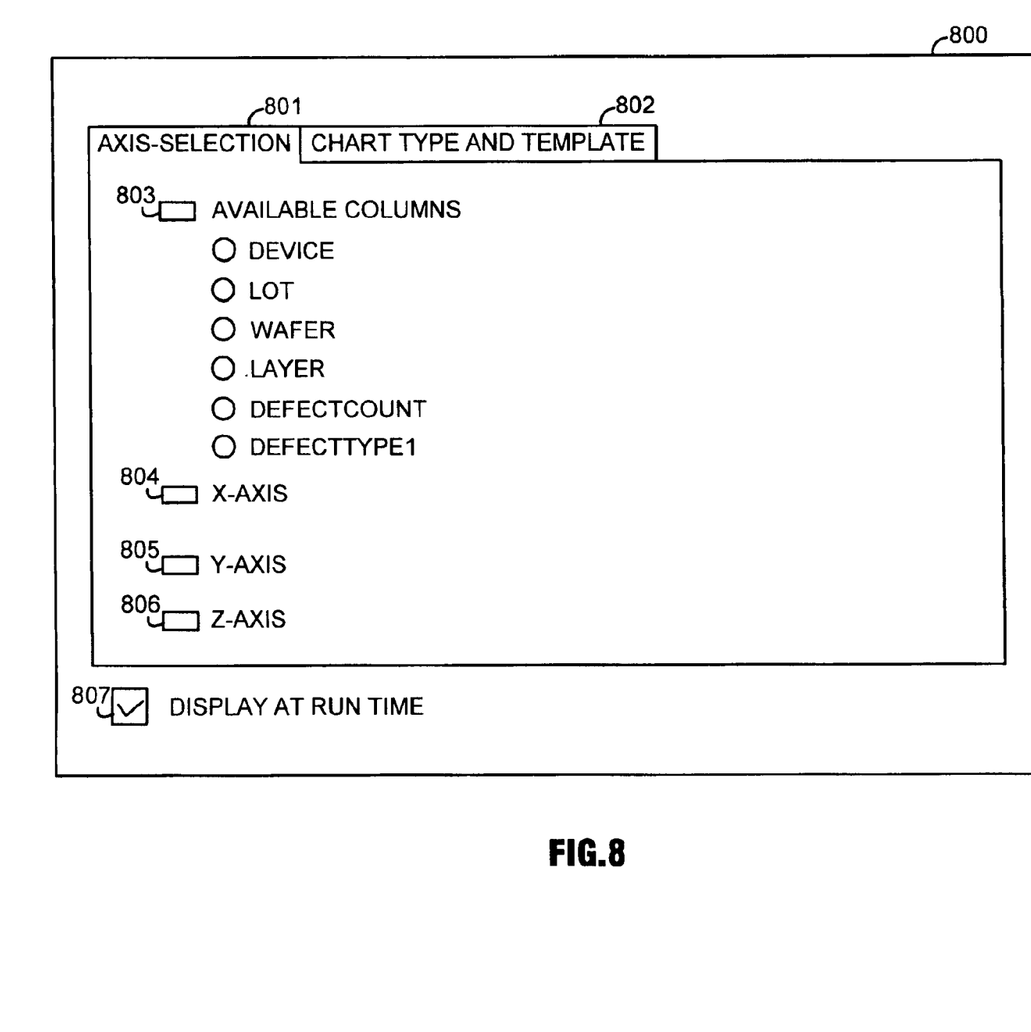
FIG. 8 illustrates, as an example, a chart axis selection object, utilizing aspects of the present invention.

The chart (CHT1) object 210 is used to define the type of chart to be displayed and its axis parameters. FIG. 8 illustrates, as an example, a property page 800 of the chart object 210. This page 800 corresponds to the "chart axis selection" tab 801. The tree control in this tab 801 contains several folders. An "available columns" folder 803 includes all available columns usable in a chart by the chart object 210. The available columns are read from the input file provided to the chart object 210. The columns or parameters can be assigned to various axes by dragging-and-dropping them into the appropriate axis folders. For example, the available columns in this case are device, lot, wafer, layer, defectcount and defecttype1. To assign "lot" to the x-axis, the item lot in the available columns folder 803 is dragged-and-dropped into the x-axis folder 804. Other assignments to the y-axis and z-axis may be made by dragging-and-dropping selections respectively into the y-axis folder 805 and z-axis folder 806. A "display at run time" box 807 is also provided to facilitate user interactively alterable operation parameters.

Figure 9:
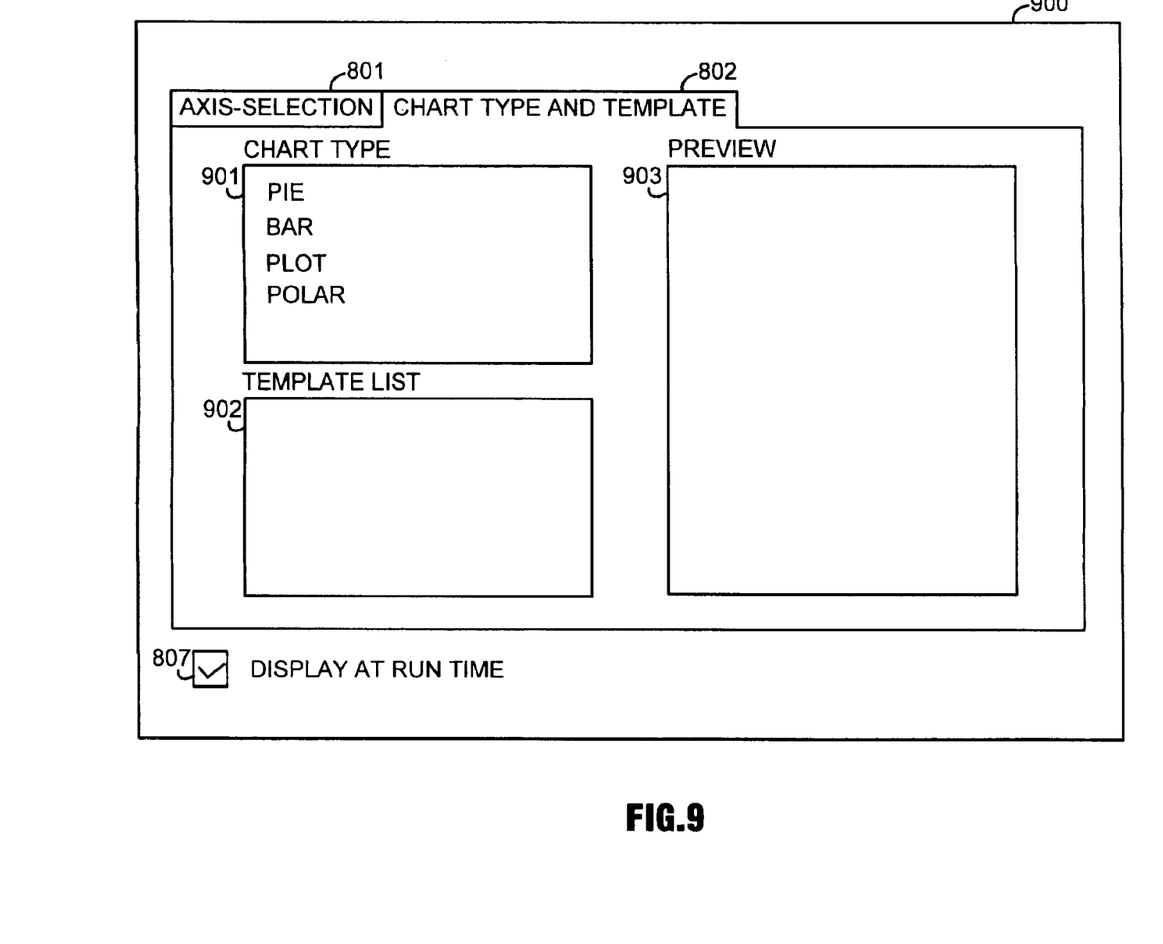
FIG. 9 illustrates, as an example, another property page for a chart axis selection object, utilizing aspects of the present invention.

FIG. 9 illustrates, as an example, a second property page 900 of the chart object 210. This page 900 corresponds to the "chart type and template" tab 802. All available chart types are listed in chart type list pane 901. As typical examples, chart types may include pie charts, bar charts, standard plots and polar plots. In practice, many more types of charts would be made available in the chart type list pane 901 then shown in the figure. Likewise, all available templates for the charts are listed in the template list pane 902. The templates specify such things as fonts and font size for the legends, among other things. A preview pane 903 then previews the chart.

An output (OUT1) object 211 receives a data file including graphics data from the chart object 210, and stores the graphics data in a specified output file for later viewing and/or invokes or launches a specified viewer such as YieldXplorer™, another product of HPL, Inc, to immediately display the graphics data on the computer display screen. The specified output file may reside on the same computer system running the user interactive program or it may reside on a remote computer in communication with the computer system. Likewise, the specified viewer may reside on the same computer system running the user interactive program or it may reside on a remote computer in communication with the computer system.

The messaging (MES) object 212 prompts the user for input when it receives an indication from the conditional execution object 208 that a pre-specified condition was met. As previously described, such indication means that the data provided by the processing object 206 was abnormal or nonconforming. The user's response and the data received from the conditional execution object 208 are then passed to switch object 212.

The switch (SW) object 212 is interactively alterable for directing data flow within the workflow 200. In this example, if the user elects to proceed after the condition is met, the switch object 212 passes the nonconforming data to a data flow path including branch processing (BP2) object 215, chart (CHT2) object 216 and output (OUT2) object 217 so that a chart of the non-conforming data may still be viewed. Since these objects function as the branch processing (BP1) object 209, chart (CHT1) object 210 and output (OUT1) object 211 already described, detailed discussion about their operation and programming are not included herein since such discussion would be redundant. If the user elects not to proceed after the condition is met, however, the switch object 212, in this example, then terminates the program as indicated by the end indicator 214 and passes the data to a specified end file or discards it.

Figure 10:
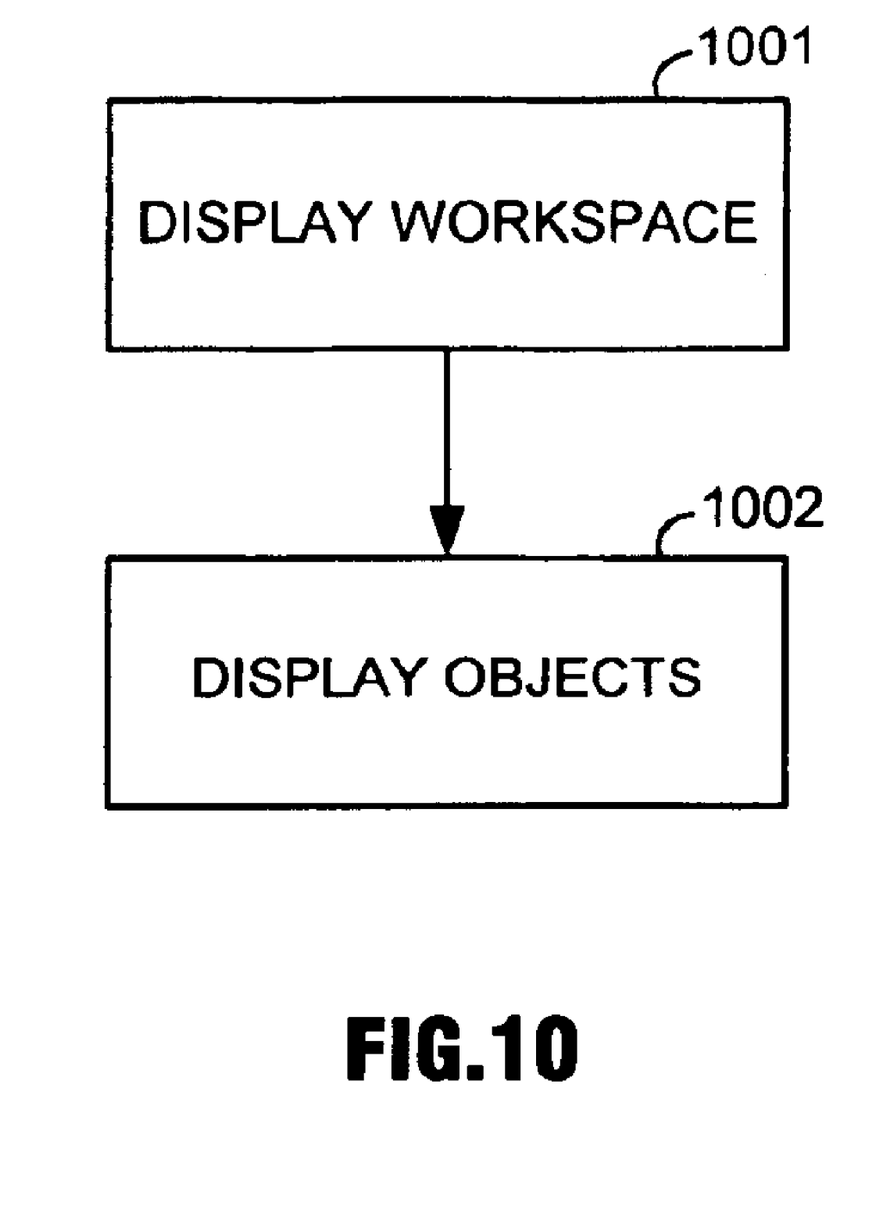
FIG. 10 illustrates, as an example, a flow diagram of a method employing workflows for developing user interactive programs.

FIG. 10 illustrates, as an example, a flow diagram of a method employing workflows for developing user interactive programs. In 1001, displaying a workspace on a computer screen is performed. In 1002, displaying a plurality of objects on the computer screen individually selectable by a program developer to be placed and coupled together in the workspace to define a workflow for a user interactive program is performed. The objects being placed and coupled include at least one of the following: an object having at least one interactively alterable operation parameter; an object performing an interactively alterable switch function for directing data flow within the workflow; an object facilitating branch processing according to a user indicated selection from displayed information generated by the user interactive program; an object that facilitates assigning a name to a selected input port of another object so that data may be directly provided to the input port; or an object prompting a user for input when a condition is met while executing the user interactive program.

Although the various aspects of the present invention have been described with respect to a preferred embodiment, it will be understood that the invention is entitled to full protection within the full scope of the appended claims.

We claim:

1. A software development tool employing workflows for developing user interactive programs, comprising:

means for displaying a workspace on a computer screen;

means for displaying a plurality of objects on said computer screen individually selectable to be placed and coupled together in said workspace to define a workflow for a user interactive program, wherein at least one of said plurality of objects has at least one interactively alterable operation parameter during execution of said user interactive program and wherein said interactively alterable operation parameter provides a parameter for data extraction for use in said user interactive program;

a first one of said plurality of objects being a first input object for extracting first specified data from a first selected database; and a second one of said plurality of objects being a second input object for extracting second specified data from a second selected database having a different schema than said first selected database.

2. The software development tool according to claim 1, further comprising means for developing a user interactive program such that at least one properties page including at least one interactively alterable operation parameter is displayable to a user prior to execution of said user interactive program.

3. The software development tool according to claim 2, wherein said at least one properties page includes a properties page for each object having at least one interactively alterable operation parameter.

4. The software development tool according to claim 1, further comprising means for developing a user interactive program such that at least one properties page including an interactively alterable switch function for directing data flow from said first and second input objects to a remainder of said workflow is displayable to a user prior to execution of said user interactive program.

5. The software development tool according to claim 1, wherein one of said plurality of objects is an output object programmable to store output data in a specified output file.

6. The software development tool according to claim 5, wherein said specified output file resides on a remote computer.

7. The software development tool according to claim 5, wherein said output object is programmable to provide said output data to an executable program.

8. The software development tool according to claim 5, wherein said output object is programmable to provide said output data to an executable program, and launch said executable program.

9. The software development tool according to claim 5, wherein said output object is programmable to provide said output data to an executable program residing on a remote computer.

10. The software development tool according to claim 5, wherein said output object is programmable to provide said output data to an executable program residing on a remote computer, and launch said executable program.

11. The software development tool according to claim 1, wherein one of said plurality of objects performs an interactively alterable switch function for directing data flow within said workflow.

12. The software development tool according to claim 1, wherein one of said plurality of objects facilitates branch processing according to a user indicated selection from displayed information generated by said user interactive program.

13. The software development tool according to claim 1, wherein one of said plurality of objects facilitates assigning a name to a selected input port of another one of said plurality of objects so that data may be provided directly to said input port.

14. The software development tool according to claim 1, wherein one of said plurality of objects prompts a user of input when a condition is met while executing said user interactive program.

15. A method employing workflows for developing user interactive programs, comprising:

displaying a workspace on a computer screen; and displaying a plurality of objects on said computer screen individually selectable by a program developer to be placed and coupled together in said workspace to define a workflow for a user interactive program, wherein at least one of said plurality of objects has at least one interactively alterable operation parameter during execution of said user interactive program and wherein said interactively alterable operation parameter provides a parameter for data extraction for use in said user interactive program;

a first one of said plurality of objects being a first input object for extracting first specified data from a first selected database; and a second one of said plurality of objects being a second input object for extracting second specified data from a second selected database having a different schema than said first selected database.

16. The method according to claim 15, further comprising generating said user interactive program such that at least one properties page including at least one interactively alterable operation parameter is displayable to a user prior to execution of said user interactive program.

17. The method according to claim 16, wherein said at least one properties page includes a properties page for each object having at least one interactively alterable operation parameter.

18. A software development tool employing workflows for developing user interactive programs, comprising:

means for displaying a workspace on a computer screen; and means of displaying a plurality of objects on said computer screen individually selectable to be placed and coupled together in said workspace to define a workflow for a user interactive program, wherein at least one of said plurality of objects performs an interactively alterable switch function for directing data flow within said workflow;

a first one of said plurality of objects being a first input object for extracting first specified data from a first selected database; and a second one of said plurality of objects being a second input object for extracting second specified data from a second selected database having a different schema than said first selected database.

19. The software development tool according to claim 18, further comprising means for developing a user interactive program such that at least one properties page including an interactively alterable switch function for directing data flow from said first and second input objects to a remainder of said workflow is displayable to a user prior to execution of said user interactive program.

20. The software development tool according to claim 18, wherein one of said plurality of objects is an output object programmable to store output data in a specified output file.

21. The software development tool according to claim 20, wherein said specified output file resides on a remote computer.

22. The software development tool according to claim 20, wherein said output object is programmable to provide said output data to an executable program.

23. The software development tool according to claim 20, wherein said output object is programmable to provide said output data to an executable program, and launch said executable program.

24. The software development tool according to claim 20, wherein said output object is programmable to provide said output data to an executable program residing on a remote computer.

25. The software development tool according to claim 20, wherein said output object is programmable to provide said output data to an executable program residing on a remote computer, and launch said executable program.

26. The software development tool according to claim 18, wherein one of said plurality of objects has at least one interactively alterable operation parameter.

27. The software development tool according to claim 18, wherein one of said plurality of objects facilitates branch processing according to a user indicated selection from displayed information generated by said user interactive program.

28. The software development tool according to claim 18, wherein one of said plurality of objects facilitates assigning a name to a selected input port of another one of said plurality of objects so that data may be provided directly to said input port.

29. The software development tool according to claim 18, wherein one of said plurality of objects prompts a user for input when a condition is met while executing said user interactive program.

30. A method employing workflows for developing user interactive programs, comprising:
    displaying a workspace on a computer screen;
    displaying a plurality of objects on said computer screen individually selectable by a developer to be placed and coupled together in said workspace to define a workflow for a user interactive program, wherein at least one of said plurality of objects performs an interactively alterable switch function for directing data flow within said user interactive program;
    a first one of said plurality of objects being a first input object for extracting first specified data from a first selected database; and
    a second one of said plurality of objects being a second input object for extracting second specified data from a second selected database having a different schema than said first selected database.

31. A software development tool employing workflows for developing user interactive programs, comprising:
    means for displaying a workspace on a computer screen;
    means for displaying a plurality of objects on said computer screen individually selectable to be placed and coupled together in said workspace to define a workflow for a user interactive program, wherein at least one of said plurality of objects facilitates branch processing according to a user indicated selection from displayed information generated by said user interactive program;
    a first one of said plurality of objects being a first input object for extracting first specified data from a first selected database; and
    a second one of said plurality of objects being a second input object for extracting second specified data from a second selected database having a different schema than said first selected database.

32. The software development tool according to claim 31, further comprising means for developing a user interactive program such that at least one properties page including at least one interactively alterable switch function for directing data flow from said first and second input objects to a remainder of said workflow is displayable to a user prior to execution of said user interactive program.

33. The software development tool according to claim 31, wherein one of said plurality of objects is an output object programmable to store output data in a specified output file.

34. The software development tool according to claim 33, wherein said specified output file resides on a remote computer.

35. The software development tool according to claim 33, wherein said output object is programmable to provide said output data to an executable program.

36. The software development tool according to claim 33, wherein said output object is programmable to provide said output data to an executable program, and launch said executable program.

37. The software development tool according to claim 33, wherein said output object is programmable to provide said output data to an executable program residing on another computer.

38. The software development tool according to claim 33, wherein said output object is programmable to provide said output data to an executable program residing on another computer, and launch said executable program.

39. The software development tool according to claim 31, wherein one of said plurality of objects has at least one interactively alterable operation parameter.

40. The software development tool according to claim 31, wherein one of said plurality of objects performs an interactively alterable switch function for directing data flow within said workflow.

41. The software development tool according to claim 31, wherein one of said plurality of objects facilitates assigning a name to a selected input port of another one of said plurality of objects so that data may be provided directly to said input port.

42. The software development tool according to claim 31, wherein one of said plurality of objects prompts a user for input when a condition is met while executing said user interactive program.

43. A method employing workflows for developing user interactive programs, comprising:
    displaying a workspace on a computer screen; and
    displaying a plurality of objects on said computer screen individually selectable by a developer to be placed and coupled together in said workplace to define a workflow for a user interactive program, wherein at least one of said plurality of objects facilitates branch processing according to a user indicated selection from displayed information generated by said user interactive program wherein a first one of said plurality of objects being a first input object for extracting first specified data from a first selected database and a second one of said plurality of objects being a second input object for extracting second specified data from a second selected database having a different schema than said first selected database.

44. A Software development tool employing workflows for developing user interactive programs, comprising:
    means for displaying a workspace on a computer screen; and
    means for displaying a plurality of objects on said computer screen individually selectable to be placed and coupled together in said workspace to define a workflow for a user interactive program, wherein at least one of said plurality of objects facilitates assigning a name to a selected input port of another one of said plurality of objects so that data may be provided directly to said input port wherein a first one of said plurality of objects being a first input object for extracting first specified data from a first selected database and a second one of said plurality of object being a second input object for extracting second specified data from a second selected database having a different schema than said first selected database.

45. The software development tool according to claim 44, wherein said data is provided by a user indicating a container for said data through a string command to execute said user interactive program.

46. The software development tool according to claim 44, wherein said data is provided by another computer program by indicating a container for said data through a string command to execute said user interactive program.

47. The software development tool according to claim 44, further comprising means for developing a user interactive program such that at least one properties page including at least one interactively alterable switch function for directing data flow from said first and second input objects to a remainder of said workflow is displayable to a user prior to execution of said user interactive program.

48. The software development tool according to claim 44, wherein one of said plurality of objects is an output object programmable to store output data in a specified output file.

49. The software development tool according to claim 48, wherein said specified output file resides on a remote computer.

50. The software development tool according to claim 48, wherein said output object is programmable to provide said output data to an executable program.

51. The software development tool according to claim 48, wherein said output object is programmable to provide said output data to an executable program, and launch said executable program.

52. The software development tool according to claim 48, wherein said output object is programmable to provide said output data to an executable program residing on a remote computer.

53. The software development tool according to claim 48, wherein said output object is programmable to provide said output data to an executable program residing on a remote computer, and launch said executable program.

54. The software development tool according to claim 44, wherein one of said plurality of objects has at least one interactively alterable operation parameter.

55. The software development tool according to claim 44, wherein one of said plurality of objects performs an interactively alterable switch function for directing data flow within said workflow.

56. The software development tool according to claim 44, wherein one of said plurality of objects facilitates branch processing according to a user indicated selection from displayed information generated by said user interactive program.

57. The software development tool according to claim 44, wherein one of said plurality of objects prompts a user for input when a condition is met while executing said user interactive program.

58. A method employing workflows for developing user interactive programs, comprising:

displaying a workspace on a computer screen; and displaying a plurality of objects on said computer screen individually selectable to be placed and coupled together in said workspace to define a workflow for a user interactive program, wherein at least one of said plurality of objects facilitates assigning a name to a selected input port of another one of said plurality of objects so that data may be provided directly to said input port wherein a first one of said plurality of objects being a first input object for extracting first specified data from a first selected database and a second one of said plurality of objects being a second input object for extracting second specified data from a second selected database having a different schema than said first selected database.

59. A software development tool employing workflows for developing user interactive programs, comprising:

means for displaying a workspace on a computer screen; and means for displaying a plurality of objects on said computer screen individually selectable to be placed and coupled together in said workspace to define a workflow for a user interactive program, wherein at least one of said plurality of objects prompts a user for input when a condition is met while executing said user interactive program wherein a first one of said plurality of objects being a first input object for extracting first specified data from a first selected database and a second one of said plurality of objects being a second input object for extracting second specified data from a second selected database having a different schema than said first selected database.

60. The software development tool according to claim 59, wherein another of said plurality of objects is a condition object facilitating interactive specification of a condition.

61. The software development tool according to claim 60, further comprising means for developing a user interactive program such that a properties page associated with said condition object and facilitating interactive specification of said condition is displaying to a user prior to execution of said user interactive program.

62. The software development tool according to claim 59, further comprising means for developing a user interactive program such that at least one properties page including an interactively alterable switch function for directing data flow from said first and second input objects to a remainder of said workflow is displayable to a user prior to execution of said user interactive program.

63. The software development tool according to claim 59, wherein one of said plurality of objects is an output object programmable to store output data in a specified output file.

64. The software development tool according to claim 63, wherein said specified output file resides on a remote computer.

65. The software development tool according to claim 64, wherein said output object is programmable to provide said output data to an executable program.

66. The software development tool according to claim 64, wherein said output object is programmable to provide said output data to an executable program, and launch said executable program.

67. The software development tool according to claim 64, wherein said output object is programmable to provide said output data to an executable program residing on a remote computer.

68. The software development tool according to claim 64, wherein said output object is programmable to provide said output data to an executable program residing on a remote computer, and launch said executable program.

69. The software development tool according to claim 59, wherein one of said plurality of objects has at least one interactively alterable operation parameter.

70. The software development tool according to claim 59, wherein one of said plurality of objects performs an interactively alterable switch function for directing data flow within said workflow.

71. The software development tool according to claim 59, wherein one of said plurality of objects facilitates branch processing according to a user indicated selection from displayed information generated by said user interactive program.

72. The software development tool according to claim 59, wherein one of said plurality of objects facilitates assigning a name to a selected input port of another one of said plurality of objects so that data may be provided directly to said input port.

73. A method employing workflows for developing user interactive programs, comprising:

displaying a workspace on a computer screen; and displaying a plurality of objects on said computer screen individually selectable by a program developer to be placed and coupled together in said workspace to define a workflow for a user interactive program, wherein at least one of said plurality of objects prompts a user for input when a condition is met while executing said user interactive program wherein a first one of said plurality of objects being a first input object for extracting first specified data from a first selected database and a second one of said plurality of objects being a second input object for extracting second specified data from a second selected database having a different schema than said first selected database.

\* \* \* \* \*